United States Patent [19]
Takahashi et al.

[11] 3,912,829
[45] Oct. 14, 1975

[54] METHOD FOR PRODUCING A POROUS TARGET FOR AN ELECTRON TUBE

[75] Inventors: Masahiko Takahashi; Eikyu Hiruma, both of Komae, Japan

[73] Assignee: Nippon Hoso Kyokai, Tokyo, Japan

[22] Filed: May 13, 1974

[21] Appl. No.: 469,433

[30] Foreign Application Priority Data
May 16, 1973  Japan.................................. 48-53501

[52] U.S. Cl. ..................... 427/78; 118/49; 427/126; 427/248
[51] Int. Cl.²........................................... B05D 5/12
[58] Field of Search.................. 117/106 R, 222, 219

[56] References Cited
UNITED STATES PATENTS
3,308,324   3/1967   Van Asselt...................... 117/219 X

*Primary Examiner*—Mayer Weinblatt
*Attorney, Agent, or Firm*—Stevens, Davis, Miller & Mosher

[57] ABSTRACT

A magnesium oxide porous target having a high heat resistance, a uniform glanularity of background and as good or better performances than potassium chloride porous targets is produced by burning metallic magnesium in a mixed gas of oxygen and an inert gas, to form magnesium oxide smoke and depositing the resulting magnesium oxide smoke on a supporting film, the total pressure of the mixed gas and the partial pressure of oxygen being specifically defined.

6 Claims, 5 Drawing Figures

FIG_1a
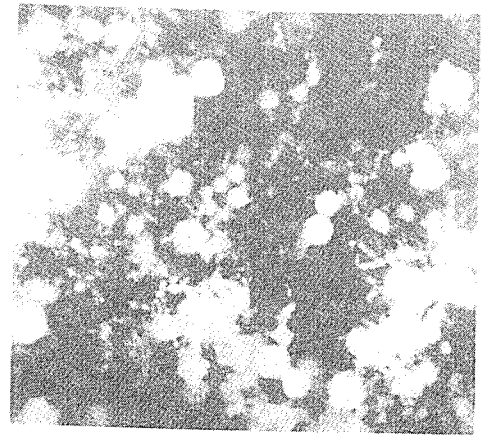
$\overline{1\mu}$
FIG_1b
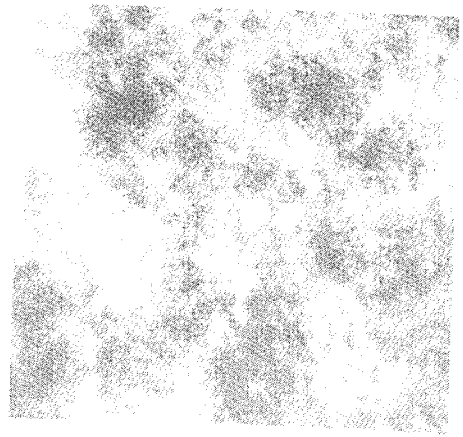
$\overline{1\mu}$

METHOD FOR PRODUCING A POROUS TARGET FOR AN ELECTRON TUBE

BACKGROUND OF THE INVENTION

The present invention relates to a method for producing a high gain secondary electron multiplying film to be used for a secondary electron conduction type camera tube or image tube, particularly a porous film using magnesium oxide. In general, in a camera tube where the above described secondary electron multiplying film is arranged so that said film constitutes a target for an electron beam, said secondary electron multiplying film is often merely referred to as "target". Therefore, in this specification, the secondary electron multiplying film and the target are handled as a synonym.

Heretofore, as the material for producing the porous high gain secondary electron multiplying film, potassium chloride has been often used, because, potassium chloride is relatively large in the secondary electron emission gain and the porous film is easily formed by an evaporation process. That is, potassium chloride is relatively low in the melting temperature and can be easily evaporated even under an inert gas atmosphere of a low vacuum. The potassium chloride porous film obtained by evaporating potassium chloride on a supporting film in a thickness of about 10–20 $\mu$ under an inert gas atmosphere, has been broadly used.

However, as mentioned above, potassium chloride is relatively low in the melting temperature and therefore in the production of a camera tube in which potassium chloride porous film obtained by the evaporation is used as a target, an exhausting and heating treatment carried out after the formation of the target, for example a treatment for highly sensitizing the photocathode surface is effected at 400°C under a high vacuum, so that the potassium chloride porous film loses the porosity during the heat treatment.

Thus, in the production of the camera tube where the potassium chloride porous film is used for the target, the temperature of the above described heat treatment must be lower than 300°C and the photocathode having a satisfactory sensitivity is obtained with difficulty.

In addition, when the secondary electron conduction type camera tube using the potassium chloride porous film is used for a television camera, the intensity of the incident light which is 1–2 orders higher than the standard highlight level of optical image causes a semipermanent dark burn on the output picture of the camera tube and the incident light level which is 4 orders higher than the standard highlight level, causes a permanent white burn. This white burn is caused for the following reason. When a photoelectron current of an excess density is flowed into the target, the temperature at this portion is raised and exceeds the melting temperature of potassium chloride and the potassium chloride is evaporated or melted, so that the scanning beam directly flows into the signal electrode (the electroconductive surface of the supporting film supporting the porous film) and the white peak is always formed in the output signal. In order to restrain the generation of this white burn phenomenon, it has been proposed that as the supporting film of the target, a mesh supporting film wherein an aluminum film is superimposed on a metal mesh, is used and the potassium chloride porous film is formed thereon. In the proposed product, the discharge of the heat as the supporting film is better than a supporting film composed of an aluminum oxide layer and an aluminum layer, which has been heretofore used, so that the raising of the temperature in the target is restrained and the intensity level of the incident light for generating the white burn can be increased by about one order (see "The Burn-resistant SEC Camera Tube " by M. Green & P. Collings, presented at Electro-Optical Systems Design Conference, Sept. 23, 1970, New York, or Japanese laid-open Patent Specification No. 3,306-71, Secondary electron conduction type camera tube). However, the dark burn is due to the color center phenomenon of potassium chloride caused by an electron bombardment (a recording action due to an electron bombardment) and the dark burn is not due to the temperature but is due to the property of potassium chloride. Accordingly, even when the above described mesh supporting film is used, as far as potassium chloride is used as the porous film, the intensity level of the incident light causing the dark burn is not improved.

Furthermore, the potassium chloride porous target is relatively short in the durability of the porous film in addition to the above described defects. Namely, the lag increases and the lowering of gain is observed from less than 500 hours in the use of standard operation of the camera tube.

In order to improve the above described defects of the porous target using potassium chloride, a substance (insulating substance) having a higher melting temperature than potassium chloride and a same or higher secondary electron gain than potassium chloride must be used. Moreover, in order to prevent the dark burn, it is preferable not to use alkali halide series substances, which are liable to form the color center. As a substance which satisfies these requirements, there is magnesium oxide. Magnesium oxide has been known as a material having high secondary electron emission gain. Its melting temperature is 2,800°C at 1 atm. and sufficiently higher than that of potassium chloride (melting temperature: 776°C at 1 atm.). Accordingly, if magnesium oxide can form a porous film, it is very convenient as the target for the secondary electron conduction type camera tube. However, since magnesium oxide is high in the melting temperature as mentioned above, it has been difficult to form the porous film. Thus, if the vacuum is high, magnesium oxide can be directly evaporated by heating by an electron beam to form a glassy film on a supporting film of the target but the evaporation including a gas atmosphere for obtaining the porous film must be effected under a low vacuum and consequently the electron beam cannot be used as the heating source. Furthermore, the use of resistance heating is technically difficult, because the melting temperature of magnesium oxide is too high.

It has been disclosed as a method for producing magnesium oxide porous targets that metallic magnesium has been previously evaporated on a substrate in a gas atmosphere so as to form a porous film and then the porous film is oxidized to constitute a reflection type secondary electron radiation surface ("The Mechanism of Field Dependent Secondary Emission" by H. Jacobs, J. Freely, and F. A. Brand; Physical Review, Vol. 88, No. 3, p. 492, 1952). In this method, metallic magnesium is evaporated on a thick nickel substrate under oxygen of 0.08 Torr and then oxygen of 2 Torr is introduced to oxidize the magnesium porous film by heating. This reference does not disclose the heating temperature but it is presumed that in order to effect the oxidation fully, the heating temperature must be higher than 450°C. Accordingly, in the magnesium oxide secondary electron conduction type target for the electron tube aimed at in the present invention, the supporting film of the target is thin, so that such a well known production process is technically difficult in view of the heat durability of the supporting film.

In addition, there is an embodiment, in which metallic magnesium is burnt in an air atmosphere under 1 atm. and the generated smoke (magnesium oxide smoke) is deposited on a conductive surface of the supporting film to form a porous film, from which the secondary electron conduction type target is experimentally produced ("Experiment of the Secondary Electron Conduction Operation by means of Magnesium Oxide Film" by K. Sato and K. Kobayaski, NHK Laboratories; Journal of the Television Society, Vol. 20, No. 3, p. 207, 1966). Westinghouse Electric Corporation has experimental with a transmission secondary electron multiplying target (TSE target) with respect to a magnesium oxide smoke process in atmospheric pressure ("Field-Enhanced Secondary Electron Emission from Films of Low Density" by G. W. Goetze, A. H. Boerio, and M. Green; J. Appln. Phys., Vol. 35, No. 3, p. 482, 1964). These prior arts disclose that the magnesium oxide smoke targets show ununiform granularity in the porous film and block-shaped uneven brightness appears in the output picture of the camera tube where the magnesium oxide porous targets produced in these processes are used. Particularly, in the latter reference there is described that as the result, the application of the magnesium oxide smoke target has been given up and potassium chloride, excellent in view of the background has been adopted, after which the potassium chloride film has been developed to the target which is used for the secondary electron conduction type camera tube.

The inventors have been confirmed by experiments that the background of the target produced by the above described well known magnesium oxide smoke process, when said target is used as the target for the camera tube, causes such a very noticeable uneven brightness that the quality of the television picture is considerably degraded. However, measurements have been made with respect to the other various properties necessary for the camera tube and it has been found that the secondary electron gain of the secondary electron conduction type target is the same as that of the conventional potassium chloride porous target and the resolution and the burn in a short duration (a relatively short time which disappears within 30 seconds) of the magnesium oxide smoke target are as good or better than those of the potassium chloride target and particularly the durability and the burn due to an excess incident light onto the photocathode of the camera tube are much better than those of the potassium chloride target.

As mentioned above, the magnesium oxide porous film has the property that the generation of the dark burn and white burn owing to the excess intensity of the incident light is less than in the case of the potassium chloride and further the secondary electron emission gain is the same as that of potassium chloride. Accordingly, the magnesium oxide porous film is very preferable as the target for the secondary electron conduction type camera tube.

However, it has been very difficult as mentioned above to produce magnesium oxide porous film having a uniform granularity and the magnesium oxide porous film has never been practically used as the target for the secondary electron conduction type camera tube.

SUMMARY OF THE INVENTION

The object of the present invention is to provide a method for easily producing a practically useful magnesium oxide porous target having good enough properties for the target of the secondary electron conduction type camera tube.

Another object of the present invention is to provide the secondary electron conduction type camera tube in which the magnesium oxide porous film having a high heat durability and a high secondary electron emission gain is set as the target.

The production method of the present invention belongs to the magnesium oxide smoke process in the principle as mentioned above. Namely, the inventors have reviewed the smoke process which has been considered to be difficult to produce the practically useful magnesium oxide porous film having excellent properties and made experiments. As a result, it has been found that if the smoke process is carried out under a specific condition, the magnesium oxide porous film having excellent properties as the camera tube target can be produced.

With respect to the porous film obtained by depositing magnesium oxide by burning metallic magnesium under atmospheric pressure (1 atm.: 760 Torr) by the above described well known smoke process, that is, the magnesium oxide smoke target, the surface structure was determined by a scanning type electron microscope. The length (grain size of crystal) of one side of the crystal grain of the cubic system forming the porous film was about $1\mu$ in the maximum length and such crystals were dispersed between the small grain groups. The groups of the crystal grains further gather to form irregular deposit unevenness.

FIG. 1a shows a photograph of the thus obtained magnesium oxide film structure by a scanning type electron microscope. The inventors have considered that such an unevenness of the granularity is a cause for deteriorating the image uniformity of the camera tube. Thus, the inventors have contemplated to decrease the unevenness of the deposit by decreasing the maximum grain size of the deposited crystals in the magnesium oxide porous film formed by the smoke process to reduce the extent of the grain size distribution of the crystals and to uniform the grain size of the crystals and made various experiments. It has been found that when the total pressure for obtaining the magnesium oxide smoke of the mixed gas of oxygen and an inert gas stable for magnesium oxide is lowered to less than the atmospheric pressure, particularly to 0.5–200 Torr and the partial pressure of oxygen is defined to be 0.5–50 Torr and metallic magnesium is burnt under such conditions of the mixed gas atmosphere, the magnesium oxide porous target wherein the granularity of the resulting crystals is substantially uniform, can be obtained.

Under the above described evaporation conditions, the mean free path where the magnesium oxide molecules run in the evaporating vessel, increases and the impinging frequency between the mutual molecules decreases and consequently the maximum grain size of the magnesium oxide crystals (particularly the grain size of the maximum crystal) in the porous film formed on the supporting film of the target becomes smaller and the granularity as a whole is uniform.

FIG. 1b shows a photograph of the magnesium oxide porous film obtained by the method of the present invention by means of a scanning type electron microscope. As seen from this photograph, the uniformity of the background is much more improved than that of FIG. 1a. The thus obtained magnesium oxide porous target can be satisfactorily used as the target for the secondary electron conduction type camera tube.

BRIEF DESCRIPTION OF THE DRAWINGS

FIG. 1a is a photograph by a scanning type electron microscope showing the granularity of the background of the magnesium oxide porous target produced by a well known prior smoke process, FIG. 1b is a photograph by a scanning type electron microscope showing the granularity of the background of the magnesium oxide porous target obtained by the method of the present invention.

DETAILED DESCRIPTION OF THE INVENTION

Figure 2:
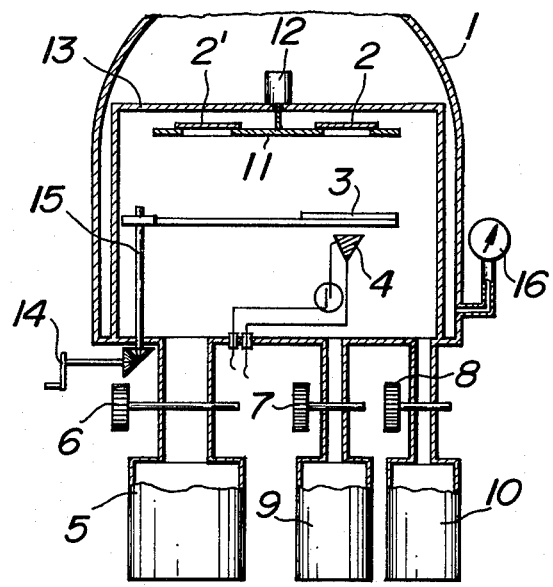
FIG. 2 is a cross-sectional view of an apparatus for carrying out the method of the present invention.

A mixed gas of oxygen and nitrogen (in this case, air) was used and the total pressure of the mixed gas was varied as shown in the following Table 1, provided that when the pressure of the mixed gas is 100 percent, the partial pressure ratio of oxygen and nitrogen are 20 and 80 percent, respectively. Under such a condition, metallic magnesium was burnt to form the magnesium oxide porous film on a supporting film of the target and the maximum grain size of the crystals in the magnesium oxide porous film was measured and the result is shown in Table 1.

Table 1

| Pressure of the mixed gas (Torr) | Maximum grain size of the crystals ($\mu$) |
| --- | --- |
| 760 | 1 |
| 200 | 0.2 |
| 50 | 0.05 |

It can be seen from the above Table 1, that the maximum grain size of the crystals decreases as the total pressure of the mixed gas decreases. When the crystal granule groups of the magnesium oxide smoke target were observed by means of a scanning type electron microscope with a magnification of more than 5,000 times, the magnesium oxide granule groups in the porous film produced under the total pressure of the mixed gas being 760 Torr (1 atm.) show such a state that sand and small stones are mixed. While the magnesium oxide granule groups in the porous target obtained by burning metallic magnesium under the total pressure of lower than 200 Torr show a uniform spongy form and the distribution of the crystal granule groups and the uniformity of the grain size are improved. FIG. 1b shows a photograph of a scanning type electron microscope in the case of the total pressure of the mixed gas of 50 Torr.

The range of the partial pressure of oxygen necessary for obtaining the magnesium oxide porous film by burning the metallic magnesium under an atmosphere of the total pressure of the mixed gas of 0.5–200 Torr, is an essential requirement of the present invention. The inventors have made an experiment in which the metallic magnesium is burnt by varying independently each partial pressure of oxygen and an inert gas, such as nitrogen or argon and the formed smoke is deposited on a supporting film to produce a magnesium oxide smoke target and it has been found that the partial pressure of oxygen which can fully oxidize the magnesium to deposit the magnesium oxide on the supporting film, must be at least 0.5 Torr. When the partial pressure of oxygen is less than 0.5 Torr, unoxidized magnesium is deposited on the supporting film and the target having a satisfactory secondary electron gain cannot be obtained. On the other hand, when the partial pressure of oxygen is too large as compared with the total pressure of the mixed gas, the oxidation of magnesium is too rapid and consequently magnesium oxide blocks of a bumpy form are liable to be deposited on the supporting film and it is difficult to obtain a preferable target. The upper limit of the partial pressure of oxygen is preferred to be 50 Torr. When the partial pressure of oxygen is 0.5 Torr, the oxidation rate of magnesium oxide is slow, so that no mixed gas is necessary and therefore only oxygen may be used as a low pressure gas.

As mentioned above, the present invention comprises burning metallic magnesium under an atmosphere of a mixed gas of oxygen and a chemically inert gas against magnesium oxide, the partial pressure of oxygen being 0.5–50 Torr and the total pressure of the mixed gas being 0.5–200 Torr and depositing the resulting magnesium oxide smoke on a supporting film of a target which is previously supported under such an atmosphere, to form a magnesium oxide porous film thereon.

In general, as the supporting film of the target, use may be made of the following products. Aluminum oxide is applied on a supporting ring as a film of a thickness of about 700 A and then aluminum is evaporated thereon in a thickness of more than 500 A. A metal mesh is stretched on a supporting ring and then aluminum is evaporated thereon in a thickness of more than 300 A.

the following example is given for the purpose of illustration of this invention and is not intended as limitation thereof.

In FIG. 2, 1 is a bell jar having a sufficient capacity to a supporting film 2. In the bell jar, the supporting film 2 of a target, a shutter 3 and a basket 4 for evaporation are disposed. a plurality of supporting films 2, 2', 2'' and 2''' of the target are mounted on a disc 11 which is rotated by a small motor 12, so as to expose the supporting films downwards. the disc 11 is supported and arranged at an upper portion by a holder 13. The shutter 3 may be rotated about a shaft 15 by means of a handle 14, which is provided at an outside of the bell jar, so as to open and close the path of the evaporation from the basket 4 to the supporting film 2. The above described basket 4 is a heater in which a tungsten wire is wound in a conical shape and the conical wire is coated with alumina. 16 is a manometer showing the pressure in the bell jar, 5 is an exhausting vacuum pump, 9 is an oxygen bomb, 10 is an inert gas bomb and 6, 7 and 8 are cocks.

Figure 3:
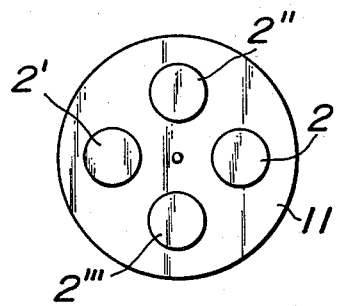
FIG. 3 is a view for explaining the arrangement of the supporting films in FIG. 2.

A ring-shaped wound metallic magnesium ribbon having a length of 10–50 mm, a width of 2.5 mm and a thickness of 0.1 mm is charged in the basket 4. Prior to starting the evaporation, the cock 6 is opened and the vacuum pump 5 is driven to exhaust air from the bell jar 1 to make the inside of the bell jar to a sufficient vacuum state and then the cock 6 is closed. In this case, the cocks 7 and 8 for feeding oxygen and the inert gas respectively have been closed. Then, when it is intended that the total pressure is 200 Torr and the partial pressure of oxygen in 50 Torr, firstly the cock 7 is opened and the oxygen gas is supplied into the bell jar 1 from the bomb 9 and when the manometer 16 shows 50 Torr, the cock 7 is closed. Then, the cock 8 is opened and the inert gas is supplied into the bell jar 1 from the bomb 10 and when the manometer 16 shows 200 Torr, the cock 8 is closed. Thereafter, an electric current is passed through a heater for the evaporation basket 4 and the metallic magnesium is reacted with oxygen in the bell jar 1 to generate magnesium oxide smoke and this smoke is deposited on the conductive surface of the supporting film 2 arranged at a distance of 50–200 mm upwards the basket 4. The supporting film 2 is arranged on the disc 11 so that a plurality of the supporting films are mounted on the disc as shown in FIG. 3. The disc 11 is rotated at a rate of 50–500 r.p.m. By such a manner, a plurality of the supporting films 2, 2′, 2″ and 2‴ are deposited uniformly with the magnesium oxide porous films. The burning time is about 3–60 seconds but in order to adjust the thickness of the deposited magnesium oxide porous film, it is merely necessary to open the shutter 3 which is provided between the basket 4 and the supporting film 2, for a given time during the burning of the metallic magnesium and this operation may be conducted automatically. The thickness of the thus obtained porous target is 5–50$\mu$, which can be used as the target for the secondary electron conduction type camera tube but in order to more improve various properties of the secondary electron gain, resolution, lag and dark current of the target, the thickness is desirable to be 10–30$\mu$.

In the above explanation, the shutter 3 is provided between the basket 4 and the supporting film 2 and this shutter is opened for a given time to form the porous film having a desired thickness but when the method is carried out under such a condition that the total pressure of the mixed gas is near 200 Torr within the range of 0.5–200 Torr, the magnesium oxide smoke rises thinly and it is difficult to obtain the porous film having a uniform thickness over the entire area. In this case, the uniform thickness of the film can be easily obtained by interposing a mesh filter between the basket 4 and the supporting film 2. Furthermore, as the total pressure is to be set lower, the rising smoke becomes thicker and the diverging angle of the smoke enlarges. Accordingly, it is easily effected to decrease the unevenness of the thickness of the magnesium oxide film depositing on the supporting film by selecting the total pressure draw near 0.5 Torr.

In the above described example, oxygen and the inert gas are separately supplied into the bell jar 1 to obtain the mixed gas having the desired partial pressure of oxygen, but the following process may be effected. Air is used as the mixed gas and it is fed into the bell jar 1 to form an atmosphere of 2.5–200 Torr (the partial pressure of oxygen is 0.5–40 Torr) and the metallic magnesium is burnt in the bell jar 1 in the same manner as described above.

The comparison of the magnesium oxide porous target produced by the method of the present invention with the well known potassium chloride porous target with respect to the performances as the camera tube target is shown in the following Table 2. The magnesium oxide porous target in Table 2 was produced by using the mixed gas of a partial pressure of oxygen of 6 Torr and a partial pressure of nitrogen of 24 Torr and the total pressure of 30 Torr and had a thickness of 20$\mu$. The potassium chloride porous target was produced under 2 Torr of argon and had a thickness of 20$\mu$. By using these targets, the secondary electron conduction type camera tubes were manufactured respectively and the camera tubes were determined with respect to the properties as shown in Table 2. From Table 2, it can be seen that when the target gain is same, the lag, burn-in (short duration) and uniformity of background in the case of the magnesium oxide are as good or better than those in the case of potassium chloride.

Table 2

| Target material | Target gain | Lag (%) | Burn-in (sec) | Uniformity of background |
|---|---|---|---|---|
| MgO | 220 | 9.6 | 2.0 | 6.5 |
| KCl |  | 12.0 | 2.0 | 5.5 |
| MgO | 160 | 7.5 | 1.0 | 6.5 |
| KCl |  | 8.6 | 1.0 | 6.0 |
| MgO | 55 | 3.0 | 0.5 | 7.0 |
| KCl |  | 3.3 | 0.5 | 7.0 |
| MgO | 30 | 2.7 | 0.5 | 7.5 |
| KCl |  | 2.7 | 0.5 | 7.5 |

Note:

Lag:

Signal current of highlight standard: 300 nA Percentage of signal current at the 3rd field after interrupting the incident light.

Burn-in:

A bar pattern having standard highlight and black bar portions is projected onto the photocathode surface of the camera tube for 30 seconds.

Then the pattern is removed and highlight standard illumination over the entire surface is left.

The duration time of the burn is measured as a time interval between this instance and when the burn disappears on the picture monitor. Unit: second.

Uniformity of background:

Visual estimation of 10 point.

10 : No stationary noise.

4 : MgO porous target produced under the air of 1 atm.

Figure 4:
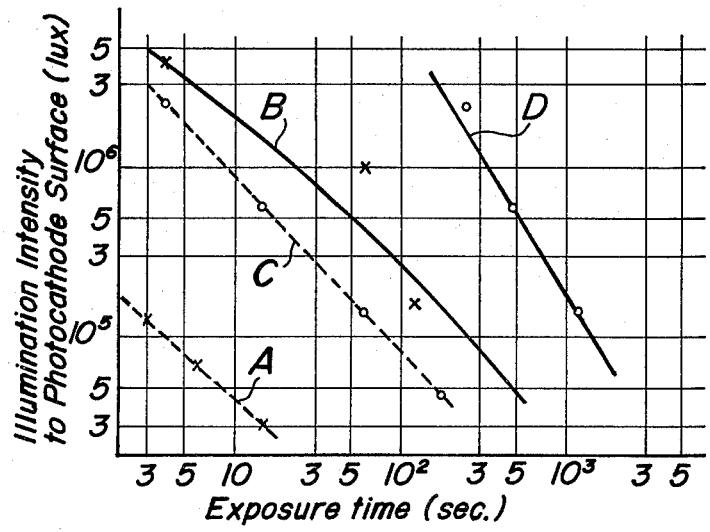
FIG. 4 is a view showing the generation limit of the dark burn and the white burn of the magnesium oxide porous target according to the present invention and the conventional potassium chloride porous target.

FIG. 4 shows a comparison between the limit for generating the dark burn and white burn phenomena of the magnesium oxide porous target produced by the method of the present invention and those of the conventional potassium chloride porous target. In this Figure, the dotted lines show the limit for generating the dark burn and the solid lines show the limits for generating the white burn and this Figure shows the relation between the illumination intensity of the photocathode surface of the camera tube and the exposure time. That is, as the illumination intensity of the photocathode surface becomes larger, unless the exposure time is reduced, the dark burn or the white burn is caused.

The lines C and D show the data of the magnesium oxide porous target and the lines A and B show the data of the conventional potassium chloride porous target. From this Figure it can be seen that the generation of both the dark burn and the white burn in the magnesium oxide porous target is caused at higher levels of the illumination intensity than that of the potassium chloride porous target under the same exposure time condition.

The magnesium oxide and potassium chloride porous target manufactured for obtaining the above data were produced under the same conditions as far as using mesh supports. The photocathode sensitivity of each camera tube was the same value of 100μA/lumen and each target gain was set to 50 times.

The present invention can easily provide the magnesium oxide porous target having the same or better properties as compared with the potassium chloride porous targer and further magnesium oxide is much higher in the melting temperature than potassium chloride as mentioned above, so that the temperature for baking the tube in the exhausting process in the production of the secondary electron conduction type camera tube may be 350–400°C at which the potassium chloride porous film loses the porosity under a highly vacuum. Accordingly, a high sensitive photocathode surface can be easily obtained. Thus, the secondary electron conduction type camera tube in which the magnesium oxide porous film is obtained by the method of the present invention can be easily manufactured. That is, the magnesium oxide porous film according to the present invention highly contributes to the production of the camera tube which has the same high secondary electron gain as the potassium chloride porous target and is as good or better in various properties, such as resolution, lag, dark current and burn in short duration, than the conventional potassium chloride porous target.

The inert gases to be used in the present invention include gases stable to magnesium oxide, such as argon and neon and helium, other than nitrogen or the mixtures thereof.

What is claimed is:

1. A method for producing a magnesium oxide porous target, which comprises burning metallic magnesium under an atmosphere of a mixed gas of gaseous oxygen and an inert gas in which magnesium oxide is stable to form magnesium oxide smoke, the total pressure of said mixed gas being 0.5–200 Torr and the partial pressure of oxygen being 0.5–50 Torr, and depositing the resulting magnesium oxide smoke on a conductive surface of a supporting film comprising aluminum and aluminum oxide for the target to form a magnesium oxide porous film.

2. The method as claimed in claim 1, wherein a thickness of the deposited magnesium oxide porous film is 10–30μ.

3. The method as claimed in claim 1, wherein the partial pressure of oxygen is 6 Torr, the partial pressure of nitrogen is 24 Torr and the total pressure of the mixed gas is 30 Torr.

4. The method as claimed in claim 3, wherein a thickness of the magnesium oxide porous film is about 20μ.

5. The method as claimed in claim 1, wherein said inert gas is selected from the group consisting of: nitrogen, argon, neon, helium or mixtures thereof.

6. The method as claimed in claim 1, wherein the supporting film comprises an aluminum oxide film having an aluminum metal film evaporated thereon, with a reinforcement metal mesh stretched thereon and a layer of aluminum metal evaporated there on.

* * * * *